US011493225B1

(12) United States Patent
Jaber et al.

(10) Patent No.: US 11,493,225 B1
(45) Date of Patent: Nov. 8, 2022

(54) SYSTEMS AND METHODS FOR CONTROLLING SUPERHEAT IN A CLIMATE CONTROL SYSTEM

(71) Applicant: Trane International Inc., Davidson, NC (US)

(72) Inventors: Youssef A. Jaber, Tyler, TX (US); Don A. Schuster, Lindale, TX (US); Nathan Smith, Tyler, TX (US); Jonathan Edward Thrift, Jacksonville, TX (US)

(73) Assignee: Trane International Inc., Davidson, NC (US)

( * ) Notice: Subject to any disclaimer, the term of this patent is extended or adjusted under 35 U.S.C. 154(b) by 122 days.

(21) Appl. No.: 16/509,250

(22) Filed: Jul. 11, 2019

(51) Int. Cl.
*F24F 11/81* (2018.01)
*F24F 11/86* (2018.01)
*F24F 11/74* (2018.01)

(52) U.S. Cl.
CPC ............. *F24F 11/81* (2018.01); *F24F 11/74* (2018.01); *F24F 11/86* (2018.01); *F25B 2600/11* (2013.01)

(58) Field of Classification Search
CPC .. F24F 11/74; F24F 11/81; F24F 11/84; F24F 11/86; F25B 2600/025; F25B 2600/11; F25B 2600/112; F25B 2600/2513; F25B 2700/1933; F25B 2700/21175
See application file for complete search history.

(56) References Cited

U.S. PATENT DOCUMENTS

| | | | |
|---|---|---|---|
| 4,523,435 A * | 6/1985 | Lord | F25B 41/062 62/212 |
| 5,771,703 A | 6/1998 | Rajendran | |
| 6,109,533 A | 8/2000 | Ao et al. | |
| 8,156,750 B2 | 4/2012 | Butorac et al. | |
| 10,247,459 B2 | 4/2019 | Nishiyama et al. | |
| 2004/0107715 A1* | 6/2004 | Lee | F25B 13/00 62/223 |
| 2009/0151378 A1* | 6/2009 | Kawakatsu | F25B 49/02 62/225 |
| 2010/0011793 A1* | 1/2010 | Tiranno | F25B 41/043 62/225 |
| 2010/0180630 A1* | 7/2010 | Ogawa | F25B 41/04 62/498 |
| 2013/0174591 A1 | 7/2013 | Das et al. | |

(Continued)

FOREIGN PATENT DOCUMENTS

| | | |
|---|---|---|
| CN | 103423835 A | 12/2013 |
| CN | 104990236 A | 10/2015 |
| CN | 105650812 A | 6/2016 |

*Primary Examiner* — Eric S Ruppert
*Assistant Examiner* — Hans R Weiland
(74) *Attorney, Agent, or Firm* — Womble Bond Dickinson (US) LLP

(57) ABSTRACT

Methods and related systems for controlling superheat in a climate control system are disclosed. In an embodiment, the method includes (a) determining a superheat of a refrigerant downstream of a coil of a heat exchanger of the climate control system. In addition, the method includes (b) determining that an expansion valve upstream of the heat exchanger is fully open. Further, the method includes (c) adjusting a speed of air flowing across the coil or a speed of a compressor of the climate control system after (b) based on the determination in (a) to control the superheat of the refrigerant.

22 Claims, 3 Drawing Sheets

(56) References Cited

U.S. PATENT DOCUMENTS

| | | | |
|---|---|---|---|
| 2014/0165612 A1* | 6/2014 | Qu | F25B 49/02 |
| | | | 62/56 |
| 2015/0059373 A1 | 3/2015 | Maiello et al. | |
| 2016/0159198 A1* | 6/2016 | Tang | B60H 1/00885 |
| | | | 700/300 |
| 2016/0200176 A1* | 7/2016 | Stanke | F25B 49/02 |
| | | | 62/115 |
| 2016/0236538 A1* | 8/2016 | Suzuki | F25B 49/022 |
| 2017/0211833 A1* | 7/2017 | Tran | F24F 11/86 |
| 2017/0343260 A1* | 11/2017 | Austin | F25B 49/025 |
| 2017/0370608 A1* | 12/2017 | Okochi | F24F 11/76 |
| 2018/0058740 A1* | 3/2018 | Nishiyama | F25B 13/00 |

* cited by examiner

SYSTEMS AND METHODS FOR CONTROLLING SUPERHEAT IN A CLIMATE CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Climate control systems, such as, for instance, heating, ventilation, and air conditioning systems (HVAC systems) may utilize refrigerants in thermodynamic processes to cool and/or heat fluids (e.g., air) for use in conditioning a temperature and/or a humidity of an indoor space (e.g., such as a residential home, office space, storage unit, etc.). Some climate control systems may comprise substantially closed refrigeration systems that include a contained mass of refrigerant that is circulated therethrough. During some operations, the refrigerant may be circulated through a heat exchanger to receive heat energy from air flowing therethrough.

BRIEF SUMMARY

Some embodiments disclosed herein are directed to a method of controlling superheat within a climate control system for an indoor space. In an embodiment, the method includes (a) determining a superheat of a refrigerant downstream of a coil of a heat exchanger of the climate control system. In addition, the method includes (b) determining that an expansion valve upstream of the heat exchanger is fully open. Further, the method includes (c) adjusting a speed of air flowing across the coil or a speed of a compressor of the climate control system after (b) based on the determination in (a) to control the superheat of the refrigerant during (c).

Other embodiments disclosed herein are directed to a climate control system for an indoor space. In an embodiment, the system includes a heat exchanger comprising a coil to flow refrigerant therethrough, a sensor configured to detect a value indicative of a superheat of the refrigerant downstream of the coil, and a fan configured to flow air over the coil. In addition, the system includes a compressor configured to compress the refrigerant, and an expansion valve upstream of the heat exchanger and downstream of the compressor. Further, the system includes a controller to be coupled to the sensor, the fan, the compressor, and the expansion valve. The controller is configured to: (a) determine the superheat of the refrigerant via the sensor; (b) determine if the expansion valve is fully open; and (c) adjust a speed of the fan or a speed of the compressor if it is determined in (b) that the expansion valve is fully open to control the superheat of the refrigerant.

Still other embodiments disclosed herein are directed to non-transitory machine readable medium including instructions that are to be executed by a processor. In an embodiment, the machine readable medium includes instructions that, when executed by the processor, cause the processor to: (a) determine a superheat of a refrigerant downstream of a coil of a heat exchanger of a climate control system; (b) determine whether an expansion valve upstream of the heat exchanger is fully open; and (c) adjust a speed of air flowing across the coil or a speed of a compressor of the climate control system if the expansion valve is determined to be fully open in (b) to control the superheat of the refrigerant.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
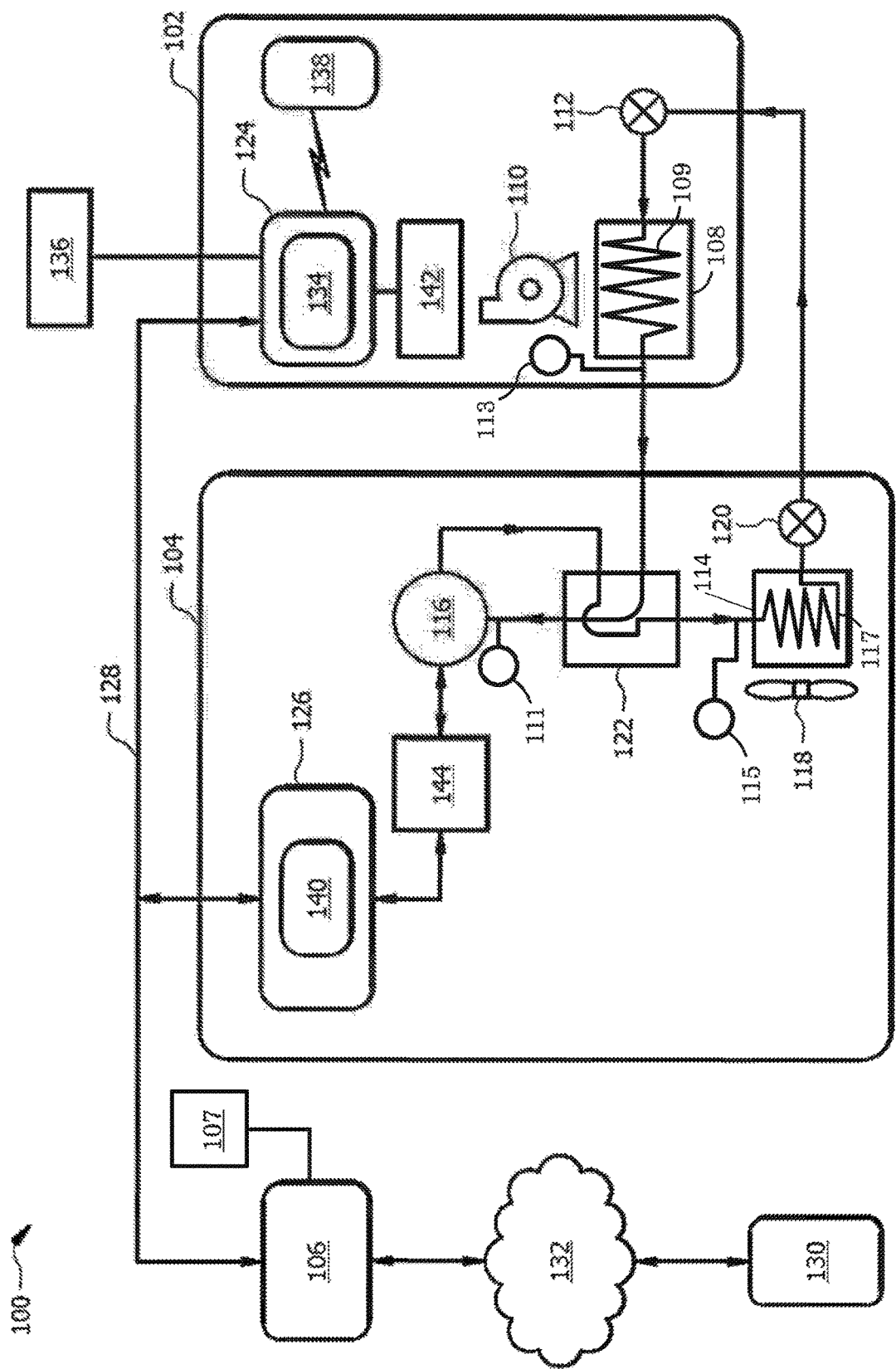
FIG. 1 is a diagram of a HVAC system configured for operating in a cooling mode according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

As previously described, refrigerant may be circulated through a heat exchanger of a climate control system to receive heat energy from air flowing therethrough. In some such systems (e.g., HVAC system as previously described above), the refrigerant may be a two phase fluid (e.g., liquid and gas) while flowing through the heat exchanger. Specifically, the refrigerant may change phase from a liquid to a gas while flowing through the heat exchanger as a result of the heat energy transferred to the refrigerant from the air flowing through the heat exchanger. Without being limited to this or any other theory, enthalpy transfer from the air to the refrigerant may be maximized while the refrigerant is vaporizing within the heat exchanger. As a result, once all of the refrigerant has vaporized (or has changed phase from liquid to gas), the refrigerant's ability to absorb additional heat energy is reduced. In addition, any heat energy that is absorbed after all of the liquid refrigerant has been vaporized may simply cause an increase in the refrigerant's temperature above the vaporization temperature. This additional temperature increase above the vaporization temperature of the refrigerant is referred to as the superheat of the refrigerant.

One may wish to avoid producing a superheat within a climate control system in order to maximize the operational efficiency thereof. Specifically, by not heating above the vaporization temperature, a climate control system may maximize the heat transfer for the refrigerant during the entire time it flows within the heat exchanger. However, because refrigerant may be routed to a compressor following the heat exchanger, one may also wish to ensure that all of the liquid refrigerant has vaporized within the heat exchanger so as to avoid sending a liquid to and through the compressor (which may result in damage thereto). Operation of a climate control system to achieve both of these objectives (e.g., complete vaporization of the refrigerant within the heat exchanger without incurring additional superheat) may be practically difficult. Accordingly, embodiments disclosed herein include systems and methods for maintaining a superheat of a refrigerant of a climate control system within a predetermined range so as to provide an enhanced level of efficiency to the system, while avoiding damage to the refrigerant compressor due to the flowing of liquid refrigerant therethrough.

Referring now to FIG. 1, a schematic diagram of a climate control system 100 according to some embodiments is shown. In this embodiment, climate control system 100 is an HVAC system, and thus, system 100 may be referred to herein as HVAC system 100. Most generally, HVAC system 100 comprises a heat pump system that may be selectively operated to implement one or more substantially closed thermodynamic refrigeration cycles to provide a cooling functionality (hereinafter "cooling mode") and/or a heating functionality (hereinafter "heating mode"). The HVAC system 100, configured as a heat pump system, generally comprises an indoor unit 102, an outdoor unit 104, and a system controller 106 that may generally control operation of the indoor unit 102 and/or the outdoor unit 104.

Indoor unit 102 generally comprises an indoor air handling unit comprising an indoor heat exchanger 108, an indoor fan 110, an indoor metering device 112, and an indoor controller 124. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. Specifically, indoor heat exchanger 108 may include a coil 109 for channeling the refrigerant therethrough that segregates the refrigerant from any air flowing through indoor heat exchanger 108 during operations. In some embodiments, the indoor heat exchanger 108 may comprise a plate-fin heat exchanger. However, in other embodiments, indoor heat exchanger 108 may comprise a microchannel heat exchanger and/or any other suitable type of heat exchanger.

The indoor fan 110 may generally comprise a centrifugal blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 (specifically across or over the coil 109) to promote heat transfer between the airflow and a refrigerant flowing through the coil 109 of the indoor heat exchanger 108. The indoor fan 110 may also be configured to deliver temperature-conditioned air from the indoor unit 102 to one or more areas and/or zones of an indoor space. The indoor fan 110 may generally comprise a mixed-flow fan and/or any other suitable type of fan. The indoor fan 110 may generally be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, however, the indoor fan 110 may be a single speed fan.

The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, a reversing valve 122, and an outdoor controller 126. In some embodiments, the outdoor unit 104 may also comprise a plurality of temperature sensors for measuring the temperature of the outdoor heat exchanger 114, the compressor 116, and/or the outdoor ambient temperature. The outdoor heat exchanger 114 may generally be configured to promote heat transfer between a refrigerant carried within internal passages of the outdoor heat exchanger 114 and an airflow that contacts the outdoor heat exchanger 114 but that is segregated from the refrigerant. Specifically, outdoor heat exchanger 114 may include a coil 117 for channeling the refrigerant therethrough that segregates the refrigerant from any air flowing through outdoor heat exchanger 114 during operations. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In some embodiments, however, the compressor 116 may comprise a modulating compressor that is capable of operation over a plurality of speed ranges, a reciprocating-type compressor, a single speed compressor, and/or any other suitable refrigerant compressor and/or refrigerant pump. In some embodiments, the compressor 116 may be controlled by a compressor drive controller 144, also referred to as a compressor drive and/or a compressor drive system.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 (specifically across or over the coil 117) to promote heat transfer between the airflow and a refrigerant flowing through coil 117 of the outdoor heat exchanger 114. The outdoor fan 118 may generally be configured as a modulating and/or variable speed fan capable of being operated at a plurality of speeds over a plurality of speed ranges. In other embodiments, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In yet other embodiments, the outdoor fan 118 may be a single speed fan. Further, in other embodiments, the outdoor fan 118 may comprise a mixed-flow fan, a centrifugal blower, and/or any other suitable type of fan and/or blower.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flow path of refrigerant through the reversing valve 122 and consequently the HVAC system 100. Additionally, the reversing valve 122 may also be selectively controlled by the system controller 106 and/or an outdoor controller 126.

The system controller 106 may generally be configured to selectively communicate with an indoor controller 124 of the indoor unit 102, an outdoor controller 126 of the outdoor unit 104, and/or other components of the HVAC system 100. In some embodiments, the system controller 106 may be configured to control operation of the indoor unit 102 and/or the outdoor unit 104. In some embodiments, the system controller 106 may be configured to monitor and/or communicate, directly or indirectly, with a plurality of sensors associated with components of the indoor unit 102, the outdoor unit 104, etc. The sensors may measure or detect a variety of parameters, such as, for example, pressure, temperature, and flow rate of the refrigerant as well as pressure and temperature of other components or fluids of or associated with HVAC system 100. In some embodiments, the HVAC system 100 may include a sensor (or plurality of sensors) for sensing or detecting the ambient outdoor temperature. Additionally, in some embodiments, the system controller 106 may comprise a temperature sensor and/or may further be configured to control heating and/or cooling of zones associated with the HVAC system 100 (e.g., within the indoor space). In some embodiments, the system controller 106 may be configured as a thermostat, having a temperature sensor and a user interface, for controlling the supply of conditioned air to zones associated within the HVAC system 100.

Figure 2:
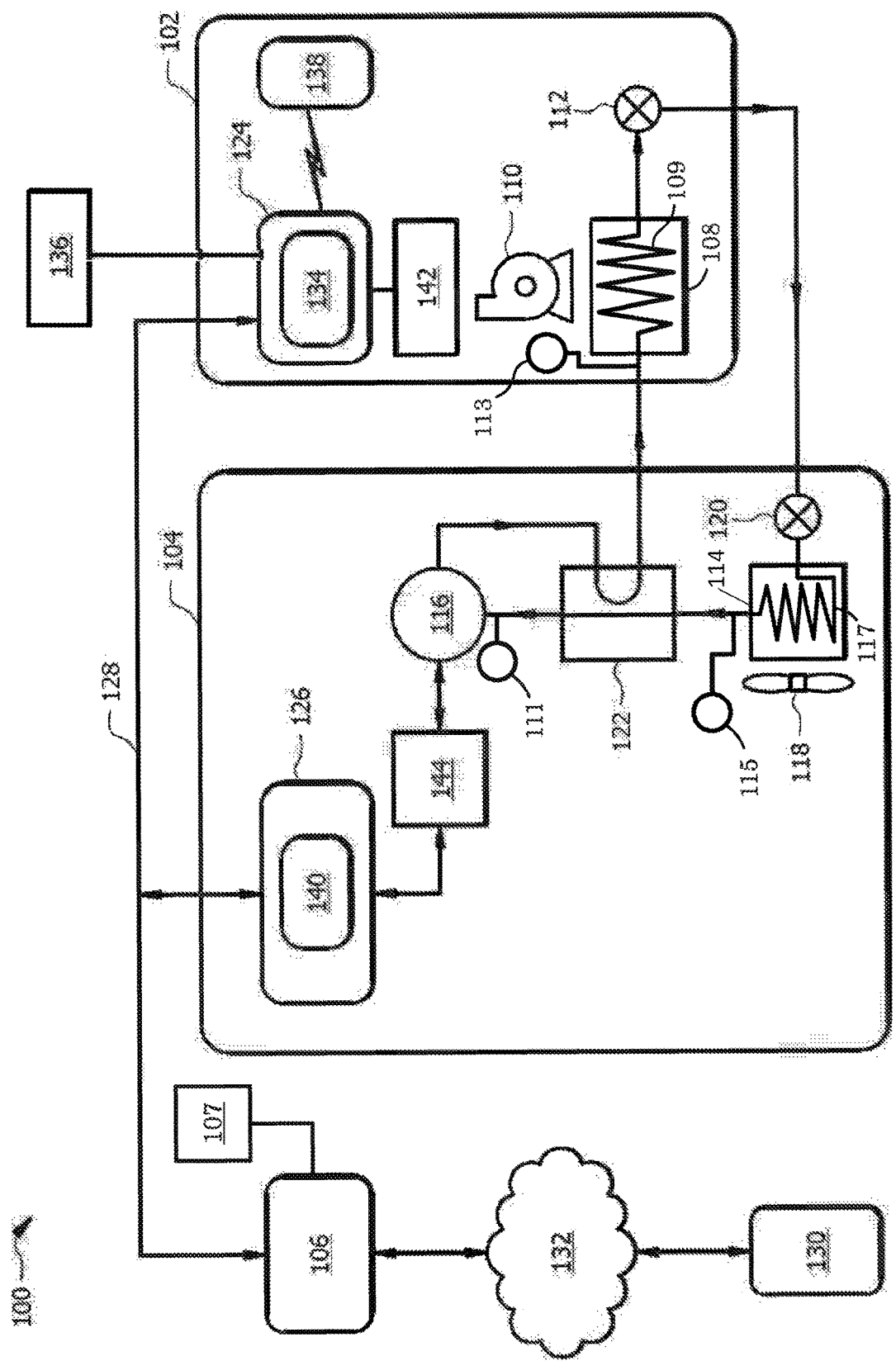
FIG. 2 is a diagram of the HVAC system of FIG. 1 configured for operating in a heating mode according to some embodiments.

In some embodiments, HVAC system 100 may include a pressure sensor 111 configured to sense or detect a pressure of the refrigerant at the suction side of compressor 116. In addition, HVAC system 100 may include a temperature sensor 113 configured to sense or detect a temperature of the refrigerant at a downstream end of the coil 109 of the indoor heat exchanger 108 (that is, at a downstream end when HVAC system 100 is operating in a cooling mode as shown in FIG. 1 and described in more detail below). Further, HVAC system 100 may include a temperature sensor 115 configured to sense or detect a temperature of the refrigerant at a downstream end of the coil 117 of outdoor heat exchanger 114 (that is, at a downstream end when HVAC system is operated in a heating mode as shown in FIG. 2 and described in more detail below). Each of the sensors 111, 113, 115 may be coupled to system controller 106 (e.g., either directly or through one of the indoor controller 124 and outdoor controller 126) through a suitable communication path (which may be any suitable wired communication path, wireless communication path, or a combination thereof). In some embodiments, one or more of the sensors 111, 113, 115 is omitted from the HVAC system 100.

The system controller 106 may also be in communication with an input/output (I/O) unit 107 (e.g., a graphical user interface, a touchscreen interface, or the like) for displaying information and for receiving user inputs. The I/O unit 107 may display information related to the operation of the HVAC system 100 (e.g., from system controller 106) and may receive user inputs related to operation of the HVAC system 100. During operations, the I/O unit 107 may communicate received user inputs to the system controller 106, which may then execute control of HVAC system 100 accordingly. Communication between the I/O unit 107 and system controller 106 may be wired, wireless, or a combination thereof. In some embodiments, the I/O unit 107 may further be operable to display information and receive user inputs tangentially and/or unrelated to operation of the HVAC system 100. In some embodiments, however, the I/O unit 107 may not comprise a display and may derive all information from inputs from remote sensors and remote configuration tools (e.g., remote computers, servers, smartphones, tablets, etc.). In some embodiments, system controller 106 may receive user inputs from remote configuration tools, and may further communicate information relating to HVAC system 100 to I/O unit 107. In these embodiments, system controller 106 may or may not also receive user inputs via I/O unit 107.

In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or any other device 130 via a communication network 132. In some embodiments, the communication network 132 may comprise a telephone network, and the other device 130 may comprise a telephone. In some embodiments, the communication network 132 may comprise the Internet, and the other device 130 may comprise a smartphone and/or other Internet-enabled mobile telecommunication device. In other embodiments, the communication network 132 may also comprise a remote server.

The indoor controller 124 may be carried by the indoor unit 102 and may generally be configured to receive information inputs, transmit information outputs, and/or otherwise communicate with the system controller 106, the outdoor controller 126, and/or any other device 130 via the communication bus 128 and/or any other suitable medium of communication. In some embodiments, the indoor controller 124 may be configured to communicate with an indoor personality module 134 that may comprise information related to the identification and/or operation of the indoor unit 102. In some embodiments, the indoor controller 124 may be configured to receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

The indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the indoor metering device 112 and/or otherwise affect control over the indoor metering device 112. The indoor EEV controller 138 may also be configured to communicate with the outdoor metering device 120 and/or otherwise affect control over the outdoor metering device 120.

The outdoor controller 126 may be carried by the outdoor unit 104 and may be configured to receive information inputs, transmit information outputs, and/or otherwise communicate with the system controller 106, the indoor controller 124, and/or any other device 130 via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

System controller 106, indoor controller 124, outdoor controller 126, compressor drive controller 144, indoor fan controller 142, and indoor EEV controller 138 may each comprise any suitable device or assembly which is capable of receiving electrical (or other data) signals and transmitting electrical (or other data) signals to other devices. In particular, while not specifically shown, controllers 106, 124, 126, 138, 142, and 144 may each include a processor and a memory. The processors (e.g., microprocessor, central processing unit, or collection of such processor devices, etc.) may execute machine readable instructions (e.g., non-transitory machine readable medium) provided on the corresponding memory to provide the processor with all of the functionality described herein. The memory of each controller 106, 124, 126, 138, 142, and 144 may comprise volatile storage (e.g., random access memory), non-volatile storage (e.g., flash storage, read only memory, etc.), or combinations of both volatile and non-volatile storage. Data consumed or produced by the machine readable instructions can also be stored on the memory of controllers 106, 124, 126, 138, 142, and 144.

During operations, system controller 106 may generally control the operation of HVAC system 100 through the indoor controller 124, outdoor controller 126, compressor drive controller 144, indoor fan controller 142, and indoor EEV controller 138 (e.g., via communication bus 128). In the description below, specific control methods are described (e.g., method 200). It should be understood that the features of these described methods may be performed (e.g., wholly or partially) by system controller 106, and/or by one or more of controllers 124, 126, 144, 142, 138 as directed by system controller 106. As a result, the controller or controllers of HVAC system 100 (e.g., controllers 106, 124, 126, 142, 144, 138, etc.) may include and execute machine-readable instructions (e.g., non-volatile machine readable instructions) for performing the operations and methods described in more detail below. In some embodiments, each of the controllers 106, 124, 126, 138, 142, and 144 may be embodied in a singular control unit, or may be dispersed throughout the individual controllers 106, 124, 126, 138, 142, and 144 as described above.

As shown in FIG. 1, the HVAC system 100 is configured for operating in a so-called cooling mode in which heat may generally be absorbed by refrigerant at the indoor heat exchanger 108 and rejected from the refrigerant at the outdoor heat exchanger 114. Starting at the compressor 116, the compressor 116 may be operated to compress refrigerant and pump the relatively high temperature and high pressure compressed refrigerant through the reversing valve 122 and to the outdoor heat exchanger 114, where the refrigerant may transfer heat to an airflow that is passed through and/or into contact with the outdoor heat exchanger 114 by the outdoor fan 118. After exiting the outdoor heat exchanger 114, the refrigerant may flow through and/or bypass the outdoor metering device 120, such that refrigerant flow is not substantially restricted by the outdoor metering device 120. Refrigerant generally exits the outdoor metering device 120 and flows to the indoor metering device 112, which may meter the flow of refrigerant through the indoor metering device 112, such that the refrigerant downstream of the indoor metering device 112 is at a lower pressure than the refrigerant upstream of the indoor metering device 112. From the indoor metering device 112, the refrigerant may enter the indoor heat exchanger 108. As the refrigerant is passed through coil 109 of the indoor heat exchanger 108, heat may be transferred to the refrigerant from an airflow that is passed through and/or into contact with the indoor heat exchanger 108 by the indoor fan 110. Refrigerant leaving the indoor heat exchanger 108 may flow to the reversing valve 122, where the reversing valve 122 may be selectively configured to divert the refrigerant back to the compressor 116, where the refrigeration cycle may begin again. As the refrigerant flows through coil 109, it may change phase from a liquid to a vapor as previously described.

Reference is now made to FIG. 2, which shows the HVAC system 100 configured for operating in a so-called heating mode. Most generally, the roles of the indoor heat exchanger 108 and the outdoor heat exchanger 114 are reversed as compared to their operation in the above-described cooling mode. For example, the reversing valve 122 may be controlled to alter the flow path of the refrigerant from the compressor 116 to the indoor heat exchanger 108 first and then to the outdoor heat exchanger 114, the outdoor metering device 120 may be enabled, and the indoor metering device 112 may be disabled and/or bypassed. In heating mode, heat may generally be absorbed by refrigerant at the outdoor heat exchanger 114 and rejected by the refrigerant at the indoor heat exchanger 108. As the refrigerant is passed through the coil 117 of outdoor heat exchanger 114, the outdoor fan 118 may be operated to move air into contact with the coil 117, thereby transferring heat to the refrigerant from the air surrounding the outdoor heat exchanger 114. Additionally, as refrigerant is passed through coil 109 of the indoor heat exchanger 108, the indoor fan 110 may be operated to move air into contact with the indoor heat exchanger 108, thereby transferring heat from the refrigerant to the air surrounding the indoor heat exchanger 108.

Referring now to FIGS. 1 and 2, as previously described, during operation of HVAC system 100 in the cooling mode, the refrigerant may change phase from a liquid to a vapor while flowing within coil 109 of indoor heat exchanger 108. Conversely, during operation of HVAC system 100 in the heating mode, the refrigerant may change phase from a liquid to a vapor while flowing within coil 117 of outdoor heat exchanger 114. This phase change may allow refrigerant to absorb a relatively higher amount of heat energy from the air flowing across coils 109, 117 via fans 110, 118, respectively. Once all of the refrigerant has vaporized within coils 109, 117, the refrigerant may begin to increase in temperature above the vaporization temperature. The magnitude of this rise in temperature may be referred to as the superheat of the refrigerant. In some embodiments, HVAC system 100 may be operated (e.g., via controllers 106, 124, 126, 144, 142, 138) to maintain the superheat of the refrigerant within a predetermined range, such as, for instance 10° F., 8° F., 5° F., etc. or less. As mentioned above, by maintaining the superheat within a predetermined range, inefficiencies resulting from overheating the refrigerant may be reduced, and the flowing of liquid refrigerant to the compressor 116 may be avoided during operations. Details of embodiments for operating a climate control system (e.g., HVAC system 100) to achieve such a control of the superheat are now described in more detail below.

Figure 3:
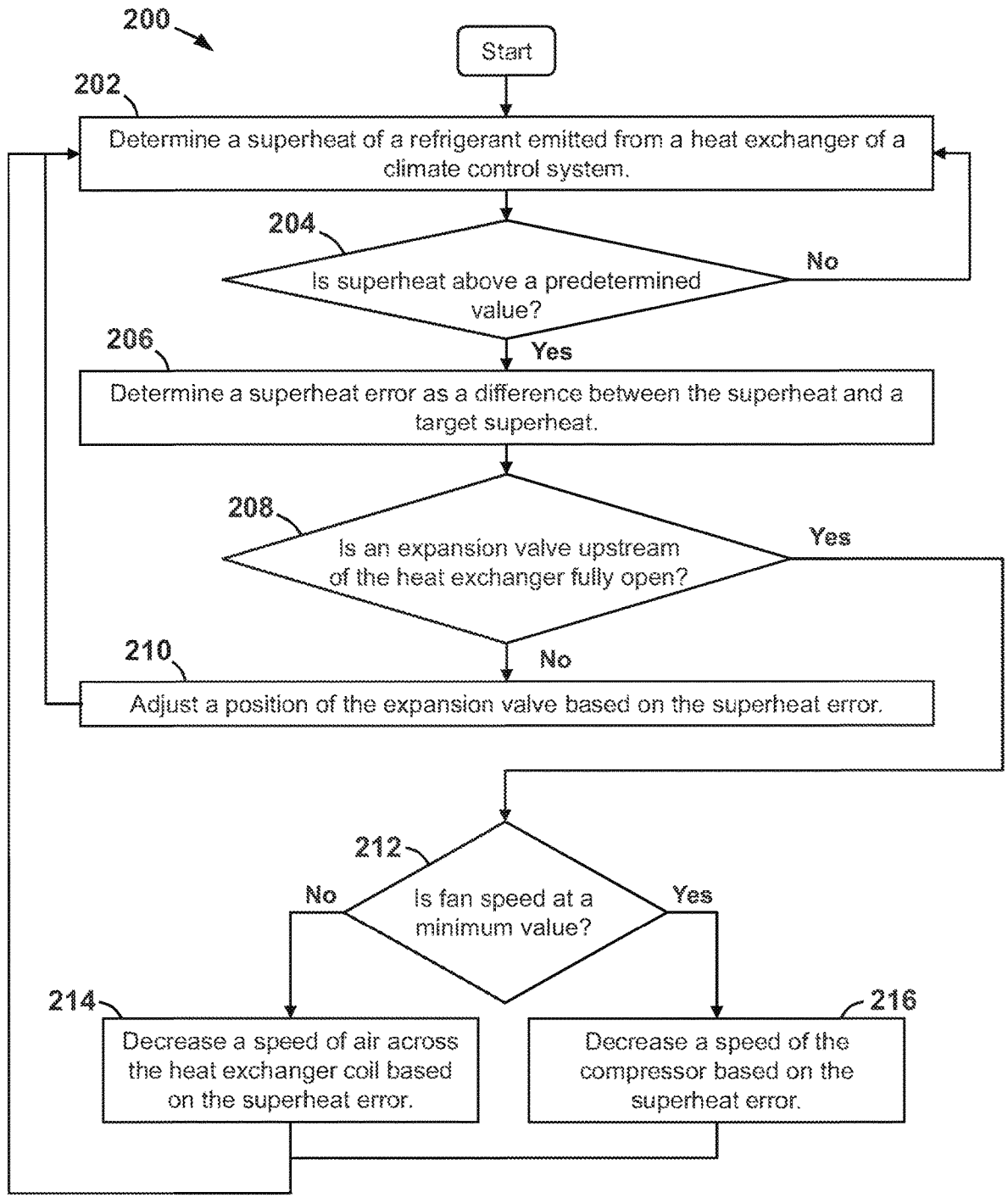
FIG. 3 is a flow chart of a method of controlling a superheat of refrigerant within a climate control system according to some embodiments.

Referring now to FIG. 3, a method 200 of controlling a superheat of a refrigerant flowing within a climate control system (e.g., HVAC system 100) is shown. In some embodiments, method 200 may be practiced with HVAC system 100 as previously described above. Thus, in describing the features of method 200, continuing reference will made to the HVAC system 100 shown in FIGS. 1 and 2; however, it should be appreciated that embodiments of method 200 may be practiced with other systems, assemblies, and devices.

Generally speaking, the superheat may be generated within a heat exchanger of the climate control system that is transferring heat to the refrigerant thereby causing the refrigerant to vaporize. Thus, as described above for the HVAC system 100, when the HVAC system 100 is operated in the cooling mode (see e.g., FIG. 1), superheat may be generated at the indoor heat exchanger 108, and when system 100 is operated in the heating mode (see e.g., FIG. 2), superheat may be generated at the outdoor heat exchanger 114. Embodiments of method 200 may be practiced to control the superheat regardless of whether the climate control system (e.g., HVAC system 100) is operated in a cooling or heating mode.

Initially, method 200 includes determining a superheat of the refrigerant emitted from a heat exchanger of a climate control system at 202. Determining the superheat at 202 may include directly measuring the superheat or estimating, inferring, or deriving the superheat based on other observations or measurements. In some embodiments, determining the superheat at 202 may include determining another value or parameter within the climate control system (e.g., HVAC system 100) that is relatable to, corresponds with, and/or is indicative of the superheat (e.g., such as a pressure or temperature of the refrigerant as measured by sensor 111). Thus, as used herein, a sensor that is configured to detect a value indicative of the superheat may refer to any sensor, or group of sensors, that is configured to sense, detect, measure, etc. a physical value(s) that may be equal to, related to, converted into, compared to, etc. the superheat of the refrigerant. For instance, as described in more detail below, a vaporization temperature (or value indicative thereof) may be determined as a proxy for superheat in some embodiments of method 200.

Referring again to FIG. 1, when HVAC system 100 is operated in the cooling mode, the superheat of the refrigerant at the outlet of coil 109 of indoor heat exchanger 108 may be determined by taking a temperature measurement with temperature sensor 113 and then comparing that measurement with the vaporization temperature of the refrigerant (which may be related to the pressure of the refrigerant as it flows through the coil 109) to provide the superheat. Conversely, referring again to FIG. 2, when HVAC system 100 is operated in the heating mode, the superheat of the refrigerant at the outlet of coil 117 of outdoor heat exchanger 114 may be determined by taking a temperature measurement with temperature sensor 115 and then comparing that measurement with the vaporization temperature of the refrigerant (which may be related to the pressure of the refrigerant as it flows through the coil 117) to provide the superheat.

Specifically, in some embodiments, an additional temperature sensor (e.g., similar to temperature sensors 113, 115), may be utilized to measure or detect a temperature of the refrigerant within the coil 109 or coil 117 during operations, which may equal or correspond to the refrigerant vaporization temperature. In other embodiments, the refrigerant vaporization temperature may be derived from a pressure of the refrigerant. For instance, in some embodiments, pressure sensor 111 may measure a pressure of the refrigerant at the suction side of compressor 116. This measured pressure may be converted (e.g., via a look up table or suitable calculation, etc.) into a saturated suction temperature (SST) of the refrigerant at the measured pressure. As used herein, the SST refers to the temperature at which the refrigerant boils/vaporizes within the evaporator coils for a given pressure. Thus, a derived value for SST may not reflect the actual temperature of the refrigerant at the suction of the compressor 116, but instead reflects the approximate vaporization temperature of the refrigerant at the measured pressure (e.g., as measured by sensor 111). However, it should be noted that the pressure of the refrigerant at the suction side of the compressor 116 (e.g., the pressure measured by sensor 111) may be slightly lower than the pressure of the refrigerant within the evaporator coil (i.e., the indoor coil 109 during cooling mode, or the outdoor coil 117 during heating mode). This is driven by a number of factors (e.g., the length of the flow path between the coils, the relative diameters of flow paths within HVAC system 100, etc.). As a result, the derived value of SST may be less than the actual vaporization temperature of the refrigerant when it was flowing within the coils 109, 117 (i.e., the coil temperature). Therefore, in some embodiments, an offset may be applied to the derived value of SST based on a known (or estimated) pressure difference of the refrigerant between coils 109, 117 and compressor 116 to thereby give the vaporization temperature of the refrigerant while it was flowing within corresponding coil 109, 117. In some embodiments, the offset between SST and the vaporization temperature may be 5° F. or less, such as, for instance 3° F. or less, or 2° F. or less, etc.

Referring again to FIG. 3, regardless of the precise method used to obtain the refrigerant vaporization temperature within coil (specifically coil 109 for cooling mode and coil 117 for heating mode), once this value is determined it may be compared with the determined value of the refrigerant temperature at the outlet of the corresponding heat exchanger coil to result in the superheat for the refrigerant at 202 of method 200. Next, method 200 may proceed to determine whether the superheat is above a predetermined value at 204. The predetermined value may be a set or variable value to provide a superheat within a predetermined range. Thus, the predetermined value may be an upper limit for the superheat. In some embodiments, the predetermined value at 204 may be 10° F., 8° F., 5° F., etc. or less. If it is determined that the superheat determined at 202 is equal to or below the predetermined value at 204 (i.e., the determination at 204 is "No"), method 200 returns to 202 to once again determine a value for the superheat.

While not specifically shown in FIG. 3, in some embodiments the determination at 204 may additionally determine whether the superheat is below a second predetermined value (which may be the same or different from the predetermined value discussed above for block 204), and if so, method 200 may proceed to adjust a position of the expansion valve based on a difference between the superheat and the second predetermined value. More specifically, method 200 may proceed to close the expansion valve (e.g., indoor metering device 112) in an effort to increase the superheat toward the predetermined value. The procedures for adjusting the position of the expansion valve to increase the superheat in these embodiments may be similar to that described below for the adjustments of the expansion valve at 210.

In some instances, a determination that the superheat is below a predetermined value may include situations where there is no superheat (i.e., the refrigerant temperature does not rise above the vaporization temperature while flowing within the indoor heat exchanger). As previously described above, and with reference to FIG. 1, if the temperature of the refrigerant does not eventually rise above the vaporization temperature while flowing through coil 109, this indicates that the liquid refrigerant may not be completely vaporizing within indoor heat exchanger 110. As a result, the work of compressor 116 is not being fully utilized within indoor heat exchanger 110 and the overall efficiency of HVAC system 100 is reduced. In addition, there is a risk that liquid may be passed through to compressor 116 during operations which may result in damage or wear thereto.

Returning to the embodiment of FIG. 3, if, on the other hand, it is determined that the superheat determined at 202 is above the predetermined value at 204 (i.e., the determination at 204 is "Yes"), then method 200 proceeds to determine a superheat error as a difference between the superheat and a target superheat at 206. In some embodiments, the target superheat may equal (or substantially equal) the predetermined value from 204. In other embodiments, the target superheat may be greater or less than the predetermined value from 204 (e.g., such as when a safety factor or margin is applied to the target superheat). The choice of the target superheat may be influenced by a number of factors such as, for instance, the responsiveness and efficiency of the system (e.g., HVAC system 100), outdoor ambient temperature, etc. Because the pressure and temperatures within a climate control system may fluctuate during operation, in some embodiments the target superheat may be of a sufficient value to reduce a risk that the refrigerant does not fully vaporize within the corresponding heat exchanger (such that liquid refrigerant may be flowed to the compressor).

In addition, method 200 also determines whether an expansion valve disposed upstream of the heat exchanger is fully open at 208. For instance, referring briefly again to FIGS. 1 and 2, when HVAC system 100 is operating in the cooling mode (see e.g., FIG. 1), block 208 may correspond with determining whether indoor metering device 112 (e.g., which may comprise an EEV as previously described) is in a fully open position. Conversely, when HVAC system 100 is operating in the heating mode (see e.g., FIG. 2), block 208 may correspond with determining whether outdoor metering device 120 is in a fully open position. If it is determined that the expansion valve (again either metering device 112 or 120) is in not in a fully open position at 208, method 200 may proceed to adjust a position (e.g., an opening position) of the expansion valve at 210 based on the superheat error determined at 206.

Referring again to FIGS. 1 and 2, without being limited to this or any other theory, by adjusting a position of the corresponding metering device (i.e., indoor metering 112 for cooling mode, or outdoor metering device 120 for heating mode), the pressure drop across and mass flow rate through metering devices 112, 120 as well as the vaporization temperature of the refrigerant may be adjusted which thereby affects the resulting superheat of the refrigerant at the outlet of coils 109, 117, respectively. Specifically, without being limited to this or any other theory, as the mass flow rate increases for refrigerant flowing through the metering device 112, 120, less enthalpy is transferred to each unit mass of refrigerant within the corresponding coil 109, 117, respectively. In addition, as the vaporization temperature of the refrigerant increases, a temperature difference between the air flowing over coil and the temperature of the coil itself also decreases such that enthalpy transfer between the air flowing within the heat exchanger and the refrigerant flowing within the corresponding coil is further reduced. Thus, vaporization may occur over a larger percentage of the heat exchanger coil (again, coil 109 for cooling mode and coil 117 for heating mode) and the temperature rise of the refrigerant (i.e., the superheat) following vaporization may be reduced. As a result, if all other variables within HVAC system 100 are held constant (or substantially constant), increasing an opening of the expansion valves 112, 120 may work to reduce the superheat within heat exchangers 108, 114, respectively. Conversely, again if all other variables within HVAC system 100 are held constant (or substantially constant), decreasing an opening of the expansion valves 112, 120 may work to increase the superheat within heat exchangers 108, 114, respectively.

Referring again to FIG. 3, the expansion valve adjustment at 210 may be proportional to or otherwise dependent on the superheat error determined at 206. In some embodiments, method 200 may employ a proportional and integral (PI) control loop, function, or scheme at 210 to provide the desired adjustments to the expansion valve (e.g., indoor metering device 112, outdoor metering device 120, etc.). Specifically, in some embodiments the superheat error from block 206 is used as a feedback error within a PI control loop for controlling the expansion valve at block 210. During this process, proportional and integral gain values may be utilized in addition the superheat error to compute the desired position of the indoor expansion valve at blocks 210. These gain values may be derived experimentally or empirically and may be specific to a type, size, model, etc. of the expansion valve (e.g., indoor metering device 112). In some embodiments, a target range (e.g., a target range of valve positions) may be computed for the indoor metering device 112 at block 210 as a part of the PI control loop described above, so as to adjust the position of indoor metering device 112 to a desired ranged of values (rather than a singular value) to affect the desired changes to the superheat.

Following the adjustment in 210, method 200 returns again to 202 to re-determine the superheat of the refrigerant as described above, and then to determine if the newly determined superheat is above the predetermined value at 204, and if so, what the superheat error is at 206. In some embodiments, the predetermined value at 204 may be the same (or substantially the same) as the predetermined value applied during the previous performance of block 204. However, in other embodiments, the predetermined value at 204 may be different at each subsequent (or at some of the subsequent) performances of block 204, based on system operations and parameters (e.g., depending on the factors described above for determining a target superheat).

If, on the other hand, it is determined at 208 that the expansion valve is fully open at 208 (i.e., the determination at 208 is "Yes"), method 200 may proceed to determine whether the heat exchanger fan speed is at a minimum value at 212. Specifically, briefly again to FIGS. 1 and 2, when HVAC system 100 is operated in the cooling mode (FIG. 1), block 212 may comprise determining whether the indoor fan 110 is at a minimum speed. Conversely, when HVAC system 100 is operated in the heating mode (FIG. 2), block 212 may comprise determining whether the outdoor fan 118 is at a minimum speed.

Indoor fan 110 and outdoor fan 118 may be operable at a number of different speeds to provide a variable flow rate of air across the corresponding coils 109, 117 as previously described above. Limits may be imposed on the operational range (e.g., the range of speeds) that fans 110, 118 may operate. For instance, in some embodiments, the blower motors that rotate the air moving components of fans 110, 118 (e.g., blades, impeller, etc.) may have a minimum speed for operation, or there may be regulatory or technical standards placing a lower limit on the speed of fans 110, 118. Thus, the minimum speed of the driver for fans 110, 118 may translate to a minimum speed of fans 110, 118 and therefore a minimum air speed across the coils 109, 117, respectively. If it is determined at the fan speed (again either indoor fan 110 or outdoor fan 118 depending on the operating mode of HVAC system 100) is not at a minimum value at 212 (i.e., the determination at 212 is "No"), then method 200 proceeds to decrease the corresponding fan speed at 214. Without being limited to this or any other theory and referring briefly again to FIG. 1, lowering the fan speed, and therefore the speed of air flowing across the corresponding coil (e.g., coils 109, 117), may reduce an enthalpy transfer between the air flowing across the coil and the refrigerant flowing within coil so that the superheat may decrease.

If, on the other hand, it is determined that that the heat exchanger fan speed is at minimum value at 212, the method 200 proceeds to decrease a speed of the refrigerant compressor at 216. Without being limited to this or any other theory, deceasing a speed of the compressor also decreases a pressure and mass flow rate of refrigerant through the heat exchanger coil (e.g., coil 109 or coil 117) and also reduces a pressure drop for the refrigerant as it flows through the corresponding metering device (e.g., indoor metering device 112 for cooling mode or outdoor metering device 120 for heating mode), such that the vaporization temperature of the refrigerant increases. Because a smaller difference between the air temperature and vaporization temperature will reduce the amount of energy (e.g., enthalpy) transferred from the air to the refrigerant, increasing the vaporization temperature of the refrigerant may also decrease a resulting superheat at the outlet of the corresponding coil.

At blocks 214, 216 of method 200, various logic, calculations, or control operations may be used to determine a magnitude of either the fan speed reduction or compressor speed decrease. For instance, in some embodiments, the changes to the speed of the fan and/or compressor at 214, 216 may be based on (e.g., proportional to) the superheat error from 206.

In addition, in some embodiments, method 200 may employ a proportional and integral (PI) control loop, function, or scheme at 214, 216 to provide the desired speed changes for the fan and compressor. Specifically, in some embodiments the superheat error from block 206 is used as a feedback error within a PI control loop for controlling the fan speed at block 214, and within a PI control loop for controlling the compressor speed at block 216. During this process, proportional and integral gain values for both the fan speed and the compressor speed may be utilized in addition the superheat error to compute the desired speeds of the fan and compressor at blocks 214, 216. These gain values may be derived experimentally or empirically and may be specific to a type, size, model, etc. of the indoor fan 100 and compressor 116. In some embodiments, a target range (e.g., a target speed range) may be computed for the fan and compressor at blocks 214 and 216, respectively, as a part of the PI control loops described above, so as to adjust the fan and compressor to a desired ranged of values (rather than a singular value) to affect the desired changes to the superheat.

As previously described, in some embodiments the vaporization temperature of the refrigerant (or a value that is related thereto) may be used as a proxy for the superheat during some or all blocks of method 200. Specifically, in some embodiments, the SST value may be obtained for the refrigerant (e.g., via pressure sensor 111 as previously described) and this SST value may be controlled in order to control a superheat of the refrigerant. Because SST provides a close approximation of the vaporization temperature of the refrigerant while flowing through evaporator coil (which comprises coil 109 in cooling mode and coil 117 in heating mode), it is also relatable to the superheat (e.g., via the actual temperature of the refrigerant at the outlet of coil 109 as measured by temperature sensor 113 or the outlet of the coil 117 as measured by temperature sensor 115). Thus, by controlling SST, one may also exercise control over the superheat in the same manner as described above. For instance, in some embodiments, the superheat error at 206 may be expressed as a corresponding SST error (e.g., wherein the SST error is a difference between a current SST and an SST target), such that the adjustments described above for the expansion valve, fan speed, and compressor speed at 210, 214, and 216, respectively, may be carried out based on the SST error. However, because SST error is simply a stand-in (or proxy) for the superheat, operation of blocks 210, 214, and 216 in this manner would still be considered to be adjustments of the expansion valve, the speed of the fan, and the speed of the compressor, respectively, based on a "superheat error" as previously described.

Following the reduction in the speed of the fan at 214 and/or decrease in the speed of the compressor at 216, the method 200 then returns to determine the superheat at 202. As a result, with each adjustment (e.g., of the expansion valve at 210, the fan speed at 214, the compressor speed at 216), the method 200 may again determine a new value for the superheat so as to determine whether additional or further adjustments are called for. Thus, method 200 may be continuously repeated during operation of the climate control system (e.g., HVAC system 100) so as to control and maintain the superheat. In some embodiments, method 200 may be performed on the order of minutes or second (e.g., approximately 5 second in some instances).

In addition, during operation of method 200, adjustments of the various previously described parameter and components are prioritized so as to achieve a desired superheat while reducing other impacts to the climate control system. Specifically, as previously described, method 200 prioritizes expansion valve adjustments (e.g., at block 210) to control or adjust superheat, as this may have a minimum impact on the capacity and overall performance of the climate control system. If expansion valve adjustments provide inadequate control to sufficiently reduce the superheat (e.g., such as when the superheat is determined to be above the predetermined minimum value at 204 and the expansion valve is fully open at 208), method 200 may then proceed to adjust the speeds of the fan and the compressor at 214, 216, respectively. However, as previously described, method 200 prioritizes adjustments of the fan speed at 214 above adjustments of compressor speed at 216, because fan speed adjustments may have a relatively smaller effect on the overall capacity and performance of the climate control system compared to compressor speed adjustments.

Thus, through use of the systems and methods described herein (e.g., HVAC system 100, method 200, etc.), a superheat of a refrigerant of a climate control system may be actively controlled during operations. Specifically, by applying a control scheme that prioritizes expansion valve adjustments over indoor fan speed and compressor speed adjustments, and then prioritizes indoor fan speed adjustments over compressor speed adjustments, the systems and methods disclosed herein may exercise enhanced control over the superheat, while avoiding (or reducing) potential upsets to the system.

The above described systems and methods may include or incorporate the use of additional sensors within a climate control system to affect the superheat control methods described herein (e.g., sensors 111, 113, 115, etc.), such that additional complexities and failure modalities are introduced, and one may not be motivated to implement such a system as a result. In addition, some might perceive the above described adjustments of system parameters (e.g., such as the compressor speed, indoor air speed, etc.) as a detriment to the system as a whole (e.g., since such adjustments may lead to instabilities within a climate control system during operations). However, the greatly enhanced superheat control achieved by the above described embodiments may provide substantial benefit for the operation of a climate control system as a whole to substantially outweigh these concerns.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of controlling superheat within a climate control system for an indoor space, the method comprising:
    (a1) operating the climate control system in a cooling mode;
    (a2) determining a superheat of a refrigerant downstream of a coil of a heat exchanger of the climate control system, wherein the heat exchanger is configured to transfer heat to the refrigerant from an airflow flowing across the coils, wherein the airflow is delivered to the indoor space;
    (a3) comparing the superheat of the refrigerant to a first target superheat during a cooling mode operation;
    (a4) comparing the superheat of the refrigerant to a second target superheat during a cooling mode operation, wherein one or both of the first target superheat and the second target superheat is a variable value based on system operations and/or parameters;
    (b) determining that an expansion valve upstream of the heat exchanger is fully open;

(c) adjusting a speed of the airflow flowing across the coil or a speed of a compressor of the climate control system after (b) based on the determination in (a2) and the comparison in (a3) and/or (a4) to control the superheat of the refrigerant while the climate control system is operating in the cooling mode, wherein the adjustment to control the superheat of the refrigerant comprises:

(c1) decreasing the speed of the airflow flowing across the coil of the heat exchanger;

(c2) determining the superheat is above the first target superheat after (c1); and (c3) decreasing the speed of the compressor based on the determination in (c2) if the speed of the airflow flowing across the coil is at a minimum value.

2. The method of claim 1, comprising:

(e) determining that the superheat is above the first target superheat after (a3);

(f) opening the expansion valve based on the determination in (e) and before the determination in (b).

3. The method of claim 1, wherein (c1) comprises decreasing the speed of the airflow based on a difference between the first target superheat and the superheat determined in (a2).

4. The method of claim 3, wherein (c3) comprises decreasing the speed of the compressor based on the difference between the first target superheat and the superheat determined in (a2).

5. The method of claim 1, wherein (c1) comprises decreasing the speed of the airflow flowing across the coil of the heat exchanger to a predetermined minimum speed of an indoor fan of the climate control system.

6. The method of claim 1, wherein (a2) comprises measuring a pressure of the refrigerant and determining the superheat of the refrigerant based on the pressure.

7. The method of claim 1, wherein (a2) comprises measuring a temperature of the refrigerant and determining the superheat of the refrigerant based on the temperature.

8. The method of claim 4, further comprising:
applying a proportional and integral (PI) control loop to decrease the speed of the airflow flowing across the coils of the heat exchanger at (c1); and
applying a PI control loop to decrease the speed of the compressor at (c3).

9. A climate control system for an indoor space, the climate control system comprising:
a heat exchanger comprising a coil to flow refrigerant therethrough;
a sensor configured to detect a value indicative of a superheat of the refrigerant downstream of the coil;
a fan configured to flow an airflow over the coil and to the indoor space;
a compressor configured to compress the refrigerant;
an expansion valve upstream of the heat exchanger and downstream of the compressor; and
a controller to be coupled to the sensor, the fan, the compressor, and the expansion valve, wherein the controller is configured to:
(a1) operate the climate control system in a cooling mode;
(a2) determine the superheat of the refrigerant via the sensor;
(a3) compare the superheat of the refrigerant to a first target superheat during a cooling mode operation;
(a4) compare the superheat of the refrigerant to a second target superheat during a cooling mode operation, wherein one or both of the first target superheat and the second target superheat is a variable value based on system operations and/or parameters;

(b) determine if the expansion valve is fully open; and (c) adjust a speed of the fan or a speed of the compressor based on the determination in (a2) and the comparison in (a3) and/or (a4) if it is determined in (b) that the expansion valve is fully open to control the superheat of the refrigerant while the climate control system is operating in the cooling mode, wherein the adjustment to control the superheat of the refrigerant comprises:

(c1) decreasing the speed of the fan to a predetermined limit;

(c2) determining that the superheat is above the first target superheat after (c1); and (c3) decreasing the speed of the compressor if the speed of the fan is at the predetermined limit.

10. The climate control system of claim 9, wherein the controller is configured to:

(d) determine that the superheat of the refrigerant is above the first target superheat; and (e) open the expansion valve based on a difference between the superheat and the first target superheat after (d) and before (b).

11. The climate control system of claim 10, wherein the controller is configured to:

(f) determine that the superheat of the refrigerant is still above the first target superheat after (e) and before (b) and (c).

12. The climate control system of claim 11, wherein at (c1) the controller is configured to decrease the speed of the fan based on a difference between the superheat and the first target superheat from (f) by apply a proportional and integral (PI) control loop; and
wherein at (c3) the controller is configured to decrease the speed of the compressor based on a difference between the superheat and the first target superheat from (c2) by apply a proportional and integral (PI) control loop.

13. The climate control system of claim 9, wherein the sensor comprises a pressure sensor configured to measure a pressure of the refrigerant at a suction side of the compressor, and wherein the controller is configured to determine the superheat based on the pressure measured by the pressure sensor.

14. The climate controller system of claim 11, wherein the controller is configured to determine a suction saturated temperature based on the pressure, and then determine the superheat based on the suction saturated temperature.

15. The climate control system of claim 9, wherein the predetermined limit is a minimum fan speed value.

16. A non-transitory machine-readable medium including instructions for controlling a climate control system for an indoor space that, when executed by a processor, cause the processor to:

(a1) operate the climate control system in a cooling mode;

(a2) determine a superheat of a refrigerant downstream of a coil of a heat exchanger of a climate control system, wherein the heat exchanger is configured to transfer heat to the refrigerant from an airflow flowing across the coils, wherein the airflow is delivered to the indoor space;

(a3) compare the superheat of the refrigerant to a first target superheat during a cooling mode operation;

(a4) compare the superheat of the refrigerant to a second target superheat during a cooling mode operation, wherein one or both of the first target superheat and the second target superheat is a variable value based on system operations and/or parameters;

(b) determine whether an expansion valve upstream of the heat exchanger is fully open; and (c) adjust a speed of the airflow flowing across the coil or a speed of a compressor of the climate control system based on the determination in (a2) and the comparison in (a3) and/or (a4) if the expansion valve is determined to be fully open in (b) to control the superheat of the refrigerant while the climate control system is operating in the cooling mode, wherein at (c), wherein the adjustment to control the superheat of the refrigerant comprises:

(c1) decreasing the speed of the airflow flowing across the coil to a predetermined limit;

(c2) determining that the superheat is still above the first target superheat after (c1); and (c3) decreasing the speed of the compressor if the speed of the airflow flowing across the coil is at the predetermined limit.

17. The non-transitory machine-readable medium of claim 16, wherein the instructions, when executed by the processor, further cause the processor to:

(d) determine that the superheat of the refrigerant is above the first target superheat;

(e) open the expansion valve based on a difference between the superheat and the first target superheat after (d) and before (b); and (f) determine that the superheat of the refrigerant is still above the first target superheat after (e) and before (b) and (c).

18. The non-transitory machine-readable medium of claim 16, wherein at (c1) the instructions, when executed by the processor, cause the processor to decrease the speed of the fan based on a difference between the superheat and the first target superheat from (f); and wherein at (c3) the instructions, when executed by the processor, cause the processor to decrease the speed of the compressor based on a difference between the superheat and the first target superheat from (c2).

19. The non-transitory machine-readable medium of claim 18, wherein the instructions, when executed by the processor, cause the processor to:

apply a proportional and integral (PI) control loop to decrease the speed of the airflow flowing across the coil at (c1); and apply a PI control loop to decrease the speed of the compressor at (c3).

20. The non-transitory machine-readable medium of claim 16, wherein the instructions, when executed by the processor, further cause the processor to:

determine a pressure of the refrigerant at a suction of the compressor of the climate control system, and then determine the superheat based on the pressure.

21. The non-transitory machine-readable medium of claim 20, wherein the instructions, when executed by the processor, further cause the processor to determine a suction saturated temperature based on the pressure, and then determine the superheat based on the suction saturated temperature.

22. The non-transitory machine-readable medium of claim 16, wherein the predetermined limit is a minimum speed of the airflow flowing across the coil.

* * * * *